Nov. 29, 1966 R. L. SCOTT 3,288,952
ELECTRO-MECHANICAL TIMER
Filed July 13, 1964 2 Sheets-Sheet 1
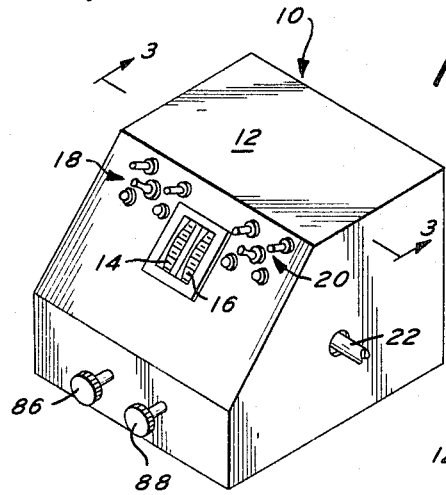
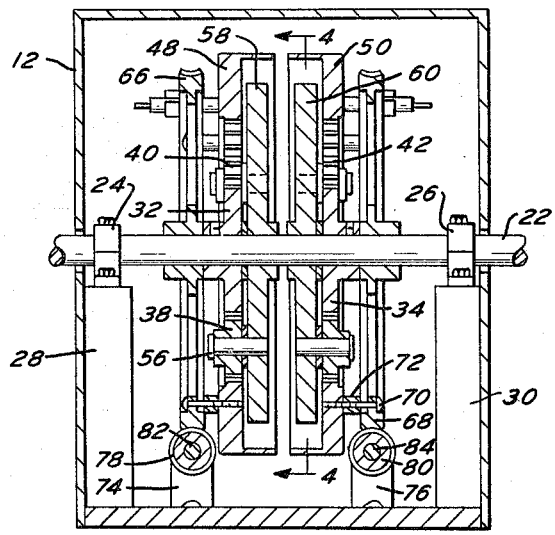
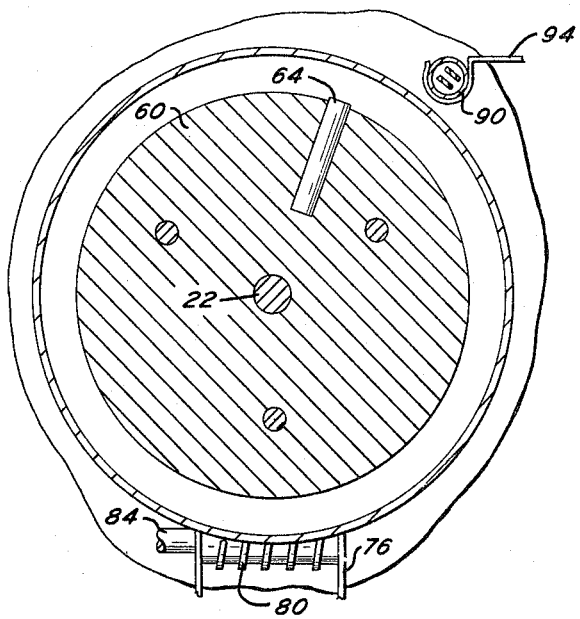
INVENTOR
ROBERT L. SCOTT
BY Seidel & Gonda
ATTORNEYS.

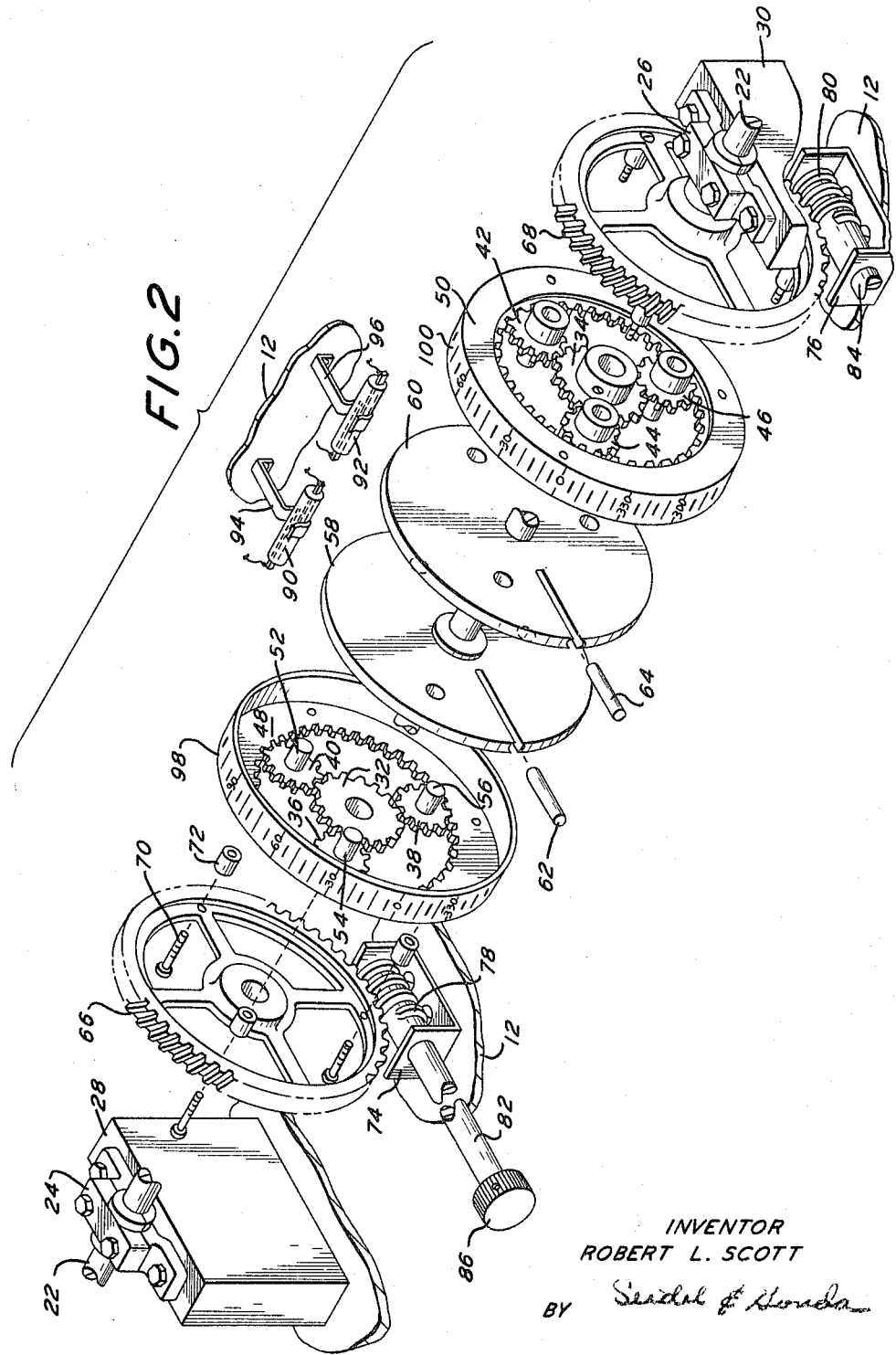

United States Patent Office

3,288,952
Patented Nov. 29, 1966

1

3,288,952
ELECTRO-MECHANICAL TIMER
Robert L. Scott, Vineland, N.J., assignor to Maul Brothers Incorporated, Millville, N.J., a corporation of New Jersey
Filed July 13, 1964, Ser. No. 382,116
4 Claims. (Cl. 200—35)

This invention relates to an electro-mechanical timer. More particularly, it relates to an electronic timing and control system which converts rotary motion into useful command information in the form of sequentially timed and controlled electrical pulses.

The present invention is a device for providing a means of obtaining continuously variable and stepless adjustment of the actuation means for controlling the operation of electrically and/or electronically operated mechanisms, devices, and circuitry in a desired time, phase, or sequence.

The present invention may be applied to control an individual section type of glass forming machine. That is, the electro-mechanical timer may be used to replace the timing drum on an individual section glass forming machine.

An individual section glass forming machine is one which is constructed of a plurality of independent sections which may be timed to be simultaneously operated and to be fed from a single feeder which discharges individual gobs or charges of molten glass, which charges are successively distributed to the various sections in a predetermined order. The machine includes a charge distributing means for conducting charges of glass from the feeder outlet to the various sections, the sections themselves, and suitable takeout means for removing the finished ware from the finishing mold of each section.

The electro-mechanical timer of the present invention can be used as an electronic timing and control system for controlling the timing and operation of the various elements of an individual section machine, by controlling the sequencing and operation of the air operated mechanisms.

It is a general object of the present invention to provide a novel electro-mechanical timer.

It is another object of the present invention to provide a novel electro-mechanical timer in which no physical contact is made between the moving parts of the timer and the switches.

It is another object of the present invention to provide a novel electro-mechanical timer in which adjustment of time, sequencing, or phase can be made while the device is operating.

It is still another object of the present invention to provide a novel electro-mechanical timer in which adjustment is continuous in a forward or reverse direction in over more than 360 degrees.

It is yet another object of the present invention to provide a novel electro-mechanical timer which requires less manual effort to set and check timing.

It is still another object of the present invention to provide a novel electro-mechanical timer which will time the operation of air and hydraulic systems.

It is a further object of the present invention to provide a novel electro-mechanical timer which will time and control the operation of the air and/or hydraulic system of an individual section glass forming machine.

It is yet another object of the present invention to provide a novel electro-mechanical timer which can be adjusted while the device it is timing is in operation.

Other objects will appear hereinafter.

FIGURE 1 is a perspective view of the electro-mechanical timer enclosed in a control housing.

2

FIGURE 2 is a perspective view of the electro-mechanical timer in exploded form.

FIGURE 3 is a front elevational view of the electro-mechanical timer assembled in its housing.

FIGURE 4 is a sectional view of the electro-mechanical timer shown in FIGURE 3, taken along the line 4—4.

For the purpose of illustrating the invention, there is shown in the drawings a form which is presently preferred; it being understood, however, that this invention is not limited to the precise arrangements and instrumentalities shown.

Referring now to the drawing, wherein like numerals indicate like elements, there is shown an electro-mechanical timer designated generally as 10.

As shown in FIGURE 1, the timer 10 is enclosed in a housing 12. The housing 12 is provided with windows 14 and 16 through which the timers calibrated indicating drums may be observed. Various controls and switches 18 and 20 may also be mounted on the housing 12 for providing over-all control.

The entire timing assembly is mounted coaxially on the central rotating shaft 22. Said central shaft 22 is suitably mounted on bearings 24 and 26 which in turn are mounted on support blocks 28 and 30. The central rotating shaft 22 is driven by an external rotating force such as a fixed or variable speed motor, or from another rotating mechanism through a system of pulleys or chains and sprockets. Thus, the period of rotation shaft 22 is controlled by an external source of power.

The sun gears 32 and 34 are solidly fixed to shaft 22 and rotate with it, functioning as driven gears in a pair of planetary gear systems. The sun gears 32 and 34 may be fixed to shaft 22 by any suitble means, such as pins or set screws. Each planetary gear system is provided with three planet gear 36, 38, 40 and 42, 44, 46, which mesh with driven sun gears 30 and 32, respectively. Internal gears 48 and 50 mesh with the planet gears 36, 38, 40 and 42, 44, 46, respectively. The internal gears 48 and 50 are normally held in a fixed position, but, as will be explained more fully below, may be adjusted.

Each of the planet gears 36, 38, 40 and 42, 44, 46 is provided with a shaft such as shafts 52, 54 and 56. The planet gears 36, 38, 40 and 42, 44, 46 are suitably mounted to their respective shafts so that they rotate freely thereon.

The three shafts extending from each of the planet gears 36, 38, 40 are solidly attached to the follower wheel 58. Similarly, the three shafts extending from each of the planet gears 42, 44, 46 are solidly attached to the follower wheel 60. The follower wheels 58 and 60 are discs rotatably mounted on shaft 22. Magnets 62 and 64 are attached to the follower wheels 58 and 60 adjacent to the periphery thereof. Magnets 62 and 64 may be permanent magnets. Each magnet 62 and 64 produces a magnetic field adjacent the area of the follower wheels 58 and 60 where it is mounted.

Internal gear 48 is fixedly attached to worm gear 66, and internal gear 50 is fixedly attached to worm gear 68. Any suitable means may be used for attaching internal gears 48 and 50 to worm gears 66 and 68. Thus, as shown, screw fasteners may extend through spacers 72 and threadedly engage the internal gears. Each of the worm gears 66 and 68 is rotatably mounted on shaft 22.

Brackets 74 and 76 rotatably support worm drive gears 78 and 80 in meshing engagement with worm gears 66 and 68. Brackets 74 and 76 may be fixed to the base of housing 12. Adjusting shafts 82 and 84 extend from worm drive gears 78 and 80 respectively and are solidly affixed thereto. Knobs 86 and 88 are mounted on the ends of adjusting shafts 82 and 84 and provide convenient means for manually rotating shafts 82 and 84. Shafts 84 and 84 could be rotated by means of servomotors or other remotely controlled devices to incorporate automatic or remotely controlled adjustment.

Suitable means, such as mounting brackets 94 and 96, are provided to mount magnetic switches 90 and 92 in close proximity to the orbital path of the rotating permanent magnets 62 and 64. The magnetic switches may be any type which will be actuated by the magnetic field produced by magnets 62 and 64. One such type of switch is the reed switch, which is a single pull single throw switch that opens and closes under the influence of a magnetic field. Such switches are available on the open market.

Each magnetic switch may be wired to external control circuitry. Such circuitry may contain relays or solenoids which control a machine or other mechanical apparatus.

Calibrated drums 98 and 100 are fixedly mounted on internal gears 48 and 50. The calibrated markings on the drums may indicate the angular position of magnets 62 and 64 relative to shaft 22, to each other or to the switches 90 and 92.

The operation of timer 10 is substantially as follows:

Rotating shaft 22 drives sun gears 32 and 34 causing planet gears 36, 38, 40 and 42, 44, 46 to orbit inside internal gears 48 and 50. The planet gears in turn cause follower members 58 and 60 to rotate, thus periodically moving magnets 62 and 64 past switches 90 and 92. Switches 90 and 92 may represent "on" and "off" controls, respectively. Thus, magnet 62 may close switch 90 thereby tripping a relay or solenoid to initiate a mechanical actuation in the controlled machine. The magnet 64 may close switch 92 thereby opening the relay or solenoid and ending the mechanical operation.

Each magnet 62 and 64 is attached to the rotating follower members 58 and 60 at a point on the circumference of rotation with respect to a fixed reference point on central rotating shaft 22. The switches 90 and 92 are further positioned at a point with reference to the fixed reference point on the central rotating shaft 22.

As long as the magnets 62 and 64 retain their position with respect to the central shaft 22, the actuation will always occur at the same point on the circle described by the magnets since the position of switches 90 and 92 is fixed.

When the relative positions of the magnets 62 and 64 in respect to the fixed reference point on shaft 22 are changed, either forwardly or backwardly with respect to the direction of rotation, the actuation of switches 90 and 92 will occur either sooner or later than in the original condition. The timing of the system is thus changed by changing the angular position of the magnets.

The actual change in relative position of magnets 62 and 64 is made by rotating worm drive gears 78 and 80. Worm drive gears 78 and 80 rotate worm gears 66 and 68 which in turn rotate internal gears 48 and 50. Internal gears 48 and 50 mesh with planet gears 36, 38, 40 and 42, 44, 46, follower members 58 and 60 are caused to rotate thereby changing the position of magnets 62 and 64 relative to shaft 22. The calibrated drums 98 and 100 indicate the relative position of magnets 62 and 64.

It should be noted that although only one pair of timing assemblies has been shown to provide an "on" and "off" actuation, any number of pairs can be mounted side by side on the central rotating shaft 22. Further, only one magnetic sensitive switch has been shown for each assembly, but any number can be placed around the orbital path of the permanent magnet. For example, to have a pulse every 60° of rotation, six magnetic switches could be uniformly spaced around the orbital path. Moreover, if the shaft 22 is rotating at a uniform velocity, then the markings on the calibrated drums could be in terms of time rather than degrees.

In operation, no physical contact is made between the moving parts of the timer 10 and the switches 90 and 92. Thus, the disadvantages of prior timing devices which relied upon actual mechanical contact between moving parts, such as a cam and cam follower, is avoided. In other words, operation is quieter, more precise, and requires less maintenance.

Adjustment of time, sequence, or phase can be made while the device is operating, by use of the planetary gear system. Thus it is not necessary to interrupt or otherwise stop the device to make adjustments.

Adjustment of the timer 10 is continuous through more than 360°. That is, if a prior art device were set at 358°, for example, and it were desired to change the time or phase to 2°, it would be necessary to adjust the controls back through 356°. With the timer 10, it is only necessary to advance the controls 4° through 360° (0°) to the 2° mark.

The foregoing features enable the timer 10 to provide improved timing control for an individual section glass forming machine. The timing can be changed across the 0°–360° point without shutting down the machine, thereby avoiding expensive cooling of heated parts and loss of time. The timer 10 allows the operation of individual sections to be completely independent of each other. This is because one section can be shut down while the others continue to operate.

In application to an individual section machine, timer 10 can be used to generate electrical pulses for actuation of solenoid controlled air valves. These air valves provide pilot air to actuate large spool valves containing a special valve block. The spool valves control the operating air for the pneumatic mechanisms in the machine.

Those skilled in the art will immediately realize that the electro-mechanical timer disclosed herein has unlimited uses in the control of machinery and other devices.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising a rotatable drive shaft, a sun gear fixed on said drive shaft and rotatable therewith, planet gears mechanically connected to said sun gear, an internal gear meshed with said planet gears and co-axial with said sun gear, said internal gear being normally held in a fixed position, a follower member adjustably mounted on said shaft, a plurality of shafts connecting said follower member to said planet gears, magnetic means mounted on said follower member, said magnetic means being adapted to actuate a magnetic switch, adjustment means connected to said internal gear for rotating said internal gear with respect to said sun gear to thereby rotate said planet gears for adjusting the rotative position of said follower member relative to said drive shaft, a calibrated drum mounted on said internal gear, said calibrated drum circumscribing the entire periphery of said internal gear, said adjustment means comprising a worm gear having teeth circumscribing the entire periphery thereof, said worm gear being rotatably mounted on said drive shaft, worm gear drive means for rotating said worm gear, said worm gear drive means being operable to rotate said worm gear throughout the entire periphery of said worm gear in either rotative direction to thereby adjust the rotative position of said follower member relative to said drive shaft.

2. Apparatus in accordance with claim 1 wherein said follower member comprises a disc, and said magnetic means includes a magnetic member retained on said disc.

3. Timing and control apparatus for an individual section glass forming machine comprising a rotatable shaft, a sun gear fixed on said shaft and rotatable therewith, planet gears meshed with said sun gear, an internal gear meshed with each of said planet gears and co-axial with said sun gear, a disc member rotatively mounted on said shaft, a separate element connecting each planet gear to said disc member so that it rotates with said planet gears, a magnetic member supported by said disc member, said magnetic member being adapted to actuate a magnetic switch, adjustment means connected to said internal gear for rotating said internal gear with respect to said sun gear to cause said planet gears to rotate about the sun gear thereby adjusting the angular position of said disc member relative to said shaft, said internal gear being otherwise non-rotatable, a plurality of fasteners for connecting said adjustment means to said internal gear, a calibrated drum circumscribing the entire periphery of said internal gear, said adjustment means comprising a worm gear having teeth circumscribing the entire periphery thereof, said worm gear being rotatably mounted on said shaft, said worm gear having said fasteners fixedly secured thereto which fasteners connect said adjustment means to said internal gear, worm gear drive means for rotating said worm gear, said worm gear drive means being operable to rotate said worm gear throughout the entire periphery of said worm gear in either rotative direction to thereby adjust the angular position of said disc member relative to said shaft.

4. Apparatus comprising a rotatable shaft, a sun gear fixed on said shaft and rotatable therewith, planet gears meshed with said sun gear, an internal gear meshed with said planet gears and co-axial with said sun gear, said internal gear being normally held in a fixed position, a follower member adjustably mounted on said shaft, a plurality of elements each co-axial with one of said planet gears, each element connecting said follower member to one of said planet gears, magnetic means mounted on said follower member, said magnetic means being adapted to actuate a magnetic switch, adjustment means connected to said internal gear for rotating said internal gear with respect to said sun gear to thereby rotate said planet gears for adjusting the rotative disposition of said follower member relative to said shaft while the shaft is rotating, a calibrated drum mounted on said internal gear, said calibrated drum circumscribing the entire outer periphery of said internal gear, said adjustment means being operable to rotate said internal gear 360 degrees in either rotative direction to thereby adjust the angular disposition of said follower member relative to said shaft.

References Cited by the Examiner

UNITED STATES PATENTS

| | | | |
|---|---|---|---|
| 2,903,528 | 9/1959 | Kuhn | 200—38 |
| 2,922,994 | 1/1960 | Kennedy | 200—19 X |
| 3,087,030 | 4/1963 | Shebanow | 200—19 X |
| 3,195,139 | 7/1965 | Hood | 200—38 X |

BERNARD A. GILHEANY, *Primary Examiner.*

H. M. FLECK, G. MAIER, *Assistant Examiners.*